May 11, 1926. 1,584,071
G. A. ARNOLD
DRILL SUPPORTING AND FEEDING APPARATUS
Filed Dec. 21, 1922
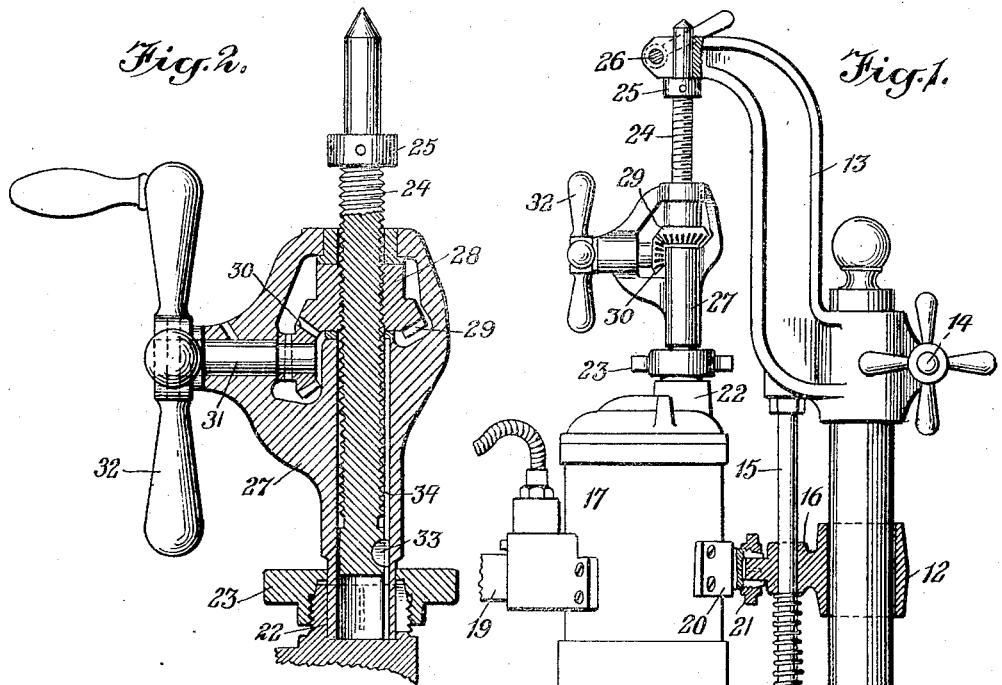
INVENTOR
George A. Arnold
BY
Dean Fairbanks Obright & Hirsch
ATTORNEYS Patented May 11, 1926.

1,584,071

UNITED STATES PATENT OFFICE.

GEORGE A. ARNOLD, OF HARTFORD, CONNECTICUT, ASSIGNOR, BY MESNE ASSIGNMENTS, TO GOODELL-PRATT COMPANY, A CORPORATION OF MASSACHUSETTS.

DRILL SUPPORTING AND FEEDING APPARATUS.

Application filed December 21, 1922. Serial No. 608,230.

This invention is an improved apparatus for supporting a portable drill and advancing or feeding it in respect to the work, whereby the drill may be accurately guided or directed and the feeding movement perfectly controlled. In its preferred form it includes a guiding member and connections secured to or adapted to be secured to the casing or frame of the drill to permit the controlled movement of said casing or frame along the guiding member. The guiding member is preferably a standard projecting at an angle to the work or work support, and the connections to the drill are preferably such that they may be disengaged at will and the drill supported by hand and used in the usual manner independently of my improved apparatus. These connections between the drill and the supporting and guiding member may be so designed as to adapt them to any standard form of portable drill with which the apparatus is to be used.

As a further feature of my invention, I provide a novel form of feeding means which may be used in connection with or independently of my improved supporting and guiding means.

In the accompanying drawings I have illustrated one form which my invention may assume, said form being designed primarily for supporting and guiding the portable electric drill illustrated in my copending application, Serial No. 583,714, filed August 23, 1922, but it will of course be evident that by making obvious minor changes in the construction the apparatus may be adapted for supporting other forms of drills and within the scope of my invention as defined in the appended claims. In these drawings:

Fig. 1 is a side elevation of the apparatus with the drill attached, certain of the parts being shown in section.

Fig. 2 is a longitudinal section of the feeding means, and

Fig. 3 is a side elevation on a smaller scale showing the feeding means used independently of the supporting means.

In the form illustrated there is provided a base 10 which may serve as a work support or merely as a support for the guiding member 11 which projects at an angle to the work or work support. The base 10 may be constructed similar to the table of an ordinary drill press, that is, it may have undercut grooves or be otherwise adapted for the clamping of work thereto.

The guiding member 11 is preferably in the form of a standard and solid or tubular in form. When the apparatus is employed for supporting the form of portable electric drill illustrated in my application above referred to, the guiding member 11 is provided with a slidable collar 12 and a bracket or arm 13. This bracket is provided with suitable means, as for instance a clamping screw 14, whereby it may be rigidly secured to the standard 11. Upon loosening the clamping screw 14 the bracket or arm 13 may be adjusted lengthwise of the standard, or rotated about the axis of the latter, and then locked in the desired adjusted position. The collar 12 is slidable on the standard but is held against any rotation independently of the rotation of the arm 13 by a guiding rod 15 which is secured to the arm 13 and extends parallel to the main guiding member or standard 11. The collar 12 is provided with a stud 16 having an aperture through which the rod 15 extends. Thus the collar may slide on the members 11 and 15 but cannot be rotated about the member 11 when the arm 13 is clamped in position.

The drill illustrated in the accompanying drawings includes a casing 17 enclosing an electric motor for driving the tool 18. The casing is provided with a handle 19 at one side and diametrically opposite to this handle is a socket member 20 with a clamping collar 21 by means of which there may be attached a second handle in the form of a rod or piece of hollow tubing. At the end of the casing opposite to the tool 18 there is provided a socket 22 and a clamping collar 23 to permit of the attachment to the casing of a breast plate or spade handle when the drill is used independently of my present apparatus.

When the drill is to be used in connection with my present improvement, the clamping collars 21 and 23 are loosened and the handles removed from the corresponding sockets. The stud 16 on the collar 12 is made of such size that it may project into the socket member 20 and be clamped rigid to the drill casing by tightening the nut 21. The feeding mechanism is clamped to the drill casing by means of the socket 22 and collar 23, and this feeding mechanism is connected to the bracket or arm 13. Such mechanism as illustrated includes a threaded member 24 preferably provided with a collar 25 and adapted to be rigidly clamped to the upper portion of the arm or bracket 13 by a clamping screw 26. The collar may abut against the under side of the arm so as to serve as the main resistance to any sliding movement of the threaded member 24 upwardly through the arm. This threaded member extends into a sleeve member 27, the lower end of which is of such size that it may be received in and clamped rigidly to the socket 22. The sleeve member carries a nut 28 held against longitudinal movement in either direction and engaging the threads of the member 24. The nut has rigidly secured thereto or integral therewith, a miter gear 29 which meshes with a miter gear 30 mounted on a shaft 31 journaled in the sleeve member 27 at right angles to the threaded member 24. This shaft 31 is provided with a suitable handle 32 whereby it may be rotated, and such rotation will cause a rotation of the nut 28 and an endwise feeding of the sleeve member 27 along the threaded rod 24. The members 24 and 27 may be held against relative rotation in any suitable manner, as for instance by a key 33 on the rod, and movable in a keyway 34 in the sleeve.

It will be noted that the rod 24 is held against rotation in respect to the arm 13, and that the sleeve 27 is held against rotation in respect to the casing of the drill. Thus there is no twisting or turning of the drill casing during an endwise movement of the latter such as results from turning the handle 32.

The feeding mechanism serves not only to feed but to support the weight of the drill. In some constructions this feeding and supporting means may serve as the sole support and guiding means for the drill. In other words, the collar 12 and its connected parts may be entirely omitted, but they are preferably employed to better hold the parts against any swaying movement and to relieve the feeding mechanism of some of the strain. The guiding rod 15 is preferably provided with a spring 35 of such size and strength that it will carry the weight of the drill when the latter is in a normal position. As the tool is fed into the work, the spring 35 will be further compressed so that when the drilling is completed the drill may be very quickly and easily lifted to bring the tool out of the work. The main lifting action will be accomplished by the spring 35 as fast as such action is permitted by the rotation of the handle 32. This spring also tends to support the drill in case the clamping screw 26 or the clamping collar 23 should loosen or permit the release of the parts under the action of the weight of the drill.

Although the work may be clamped on to the base 10, it will be apparent that by loosening the clamping screw 24 the operating parts may be rotated about the standard 11 even to a distance of 180°, so that the drill may operate on the surface or object supporting the base 10. In such case, the base would not serve to support the work, but might be supported by the work and would serve to support the standard 11.

For drilling deep holes it will be apparent that it is not necessary to have the feeding mechanism operate through a distance equal to the total depth of the hole to be drilled. After drilling the hole to the depth permitted by the feeding mechanism, the clamping screw 14 may be loosened and the arm 13 lowered on the standard, while the feeding mechanism is brought back to initial position. Thus a very deep hole may be drilled although the feeding mechanism be comparatively short.

It will be noted that the key 33 serves not only to prevent relative rotation of the threaded member 24 and the sleeve, but it also serves as a stop to engage the under side of the nut 28 and prevent the dropping of the drill by feeding the sleeve too far along its threaded support. I have illustrated the sleeve member as the one for attachment to the drill casing, and the threaded member as the one for attachment to the support 13. It will of course be evident that this is not essential as these parts might be turned end to end and the threaded member secured to the drill casing and the sleeve to the support, if made of the proper size and proportions.

The feeding mechanism illustrated particularly in Fig. 2, may be employed independently of the other parts, making up the drill stand, as shown in Fig. 1. The upper or outer end of the rod 24 may be caused to abut against any suitable form of stop, so that when the handle 32 is rotated the drill will be fed away from said stop. This is particularly useful in some cases where it is desired to drill a hole parallel to and quite close to a wall. As the tool is eccentric in respect to the drill casing and the handle 32 may be caused to extend in the same general direction as the handle 19, the drill and its feeding mechanism may be supported on the floor or against any surface, as shown in Fig. 3, and the member 24 abut against any suitable stop, the socket 20 and nut 21 being removed.

Having thus described my invention, what

I claim as new and desire to secure by Letters Patent is:—

1. A drill stand including a work support, a standard carried thereby, a bracket carried by said standard, a pair of telescoping non-rotatable members, means for detachably securing one of said members to said bracket to depend from the latter toward said work support, means for detachably securing the other of said members to the casing of an electric motor-driven drill, said members and drill being suspended from and supported by the said bracket, and means for effecting the feeding movement of the last mentioned member endwise toward said work support and in respect to the other member.

2. A drill stand including a work support, a standard carried thereby, a bracket carried by said standard, a pair of members, means for detachably securing one of said members to said bracket to depend from the latter toward said work support, means for detachably securing the other of said members to the casing of an electric motor-driven drill, said members and drill being suspended from and supported by the said bracket, means for effecting the feeding movement of the last mentioned member endwise toward said work support and in respect to the other member, a guide slidable on said standard, and means for detachably securing said guide to said drill casing.

3. A drill stand including a work support, a standard carried thereby, a bracket carried by said standard, a pair of members, means for detachably securing one of said members to said bracket to depend from the latter toward said work support, means for detachably securing the other of said members to the casing of an electric motor-driven drill with said members in alignment with each other and with the axis of said drill, said members and drill being suspended from and supported by the said bracket, and means for effecting the feeding movement of the last mentioned member endwise toward said work support and in respect to the other member.

4. In combination, a supporting member, an electric drill having a casing, a pair of non-rotatable members for connecting the said casing with and suspending it from the said support, one of said members being threaded and extending into the other, and a rotatable nut within said last mentioned member and held against longitudinal movement in respect thereto and engaging with the first of said pair, a shaft, and miter gear connections between said shaft and said nut.

5. A feeding mechanism for use in connection with portable electric drills, including a pair of non-rotatable telescoping members, means for slidably interlocking the said members with each other against relative rotary movement, the inner member being threaded, a rotatable nut on the inner member and held against longitudinal movement in respect thereto and engaging with the outer member, a shaft carried by the outer member, miter gear connections between said shaft and said nut, means for rotating said shaft, and means for securing one of said members to a drill substantially in alignment with the tool thereof.

6. The combination with a portable electric drill of a guide member, a collar slidable thereon, clamping connections between the collar and the side of the drill casing, a bracket secured to said guiding member and feeding connections between said bracket and the end of said drill casing and independent of said collar and said first mentioned connections, said feeding connections including two members slidably interlocked with each other and held against relative rotary movement, one being secured to said bracket and the other to said casing.

7. In combination, a portable standard, a pair of separate collars slidably mounted thereon, means for preventing relative rotation of said collars, means for connecting one of said collars to a drill, and feeding means for the drill carried by the other collar, said feeding means including two members slidably interlocked with each other and held against relative rotary movement.

8. In combination, a standard, a collar slidable thereon and having means for detachable engagement with a drill, a bracket secured to said casing, feeding mechanism carried by said bracket and means independent of said collar and first mentioned means for detachably securing said feeding mechanism to the drill, said feeding means including two members slidably interlocked with each other and held against relative rotary movement.

9. In combination, a standard, a collar slidable thereon and having means for detachable engagement with a drill, a bracket secured to said casing, feeding mechanism carried by said bracket and adapted to be detachably secured to the drill, means for securing said bracket in various adjusted positions in respect to said standard, and means for preventing relative rotation of the collar in respect to the bracket, but permitting limited sliding movement of the collar.

10. In combination a standard, a bracket secured thereto and having a guiding rod, a collar slidably mounted on said standard and said rod, a spring on said rod tending to support said collar, means for detachably securing said collar to a drill, and feeding connections carried by said bracket and adapted to be detachably secured to the drill.

11. A supporting and guiding apparatus for portable electric drills including a base, a standard, a bracket adjustably supported by the standard, a pair of telescoping non-rotatable members, means for securing one of said pair to said bracket, means for detachably securing the other of said pair to the drill, means for effecting the relative longitudinal movement of said pair to feed the drill, and a member adapted to be secured to the drill and independent of the connections between the drill and one of said pair and having sliding engagement with said standard.

12. A supporting and guiding apparatus for portable electric drills including a base, a standard, a bracket vertically adjustable on said standard, a pair of telescoping non-rotatable members, means for securing one of said pair to said bracket, means for detachably securing the other of said pair to the drill, means for effecting the relative longitudinal movement of said pair to feed the drill, a member adapted to be secured to the drill and having sliding engagement with said standard, and resilient means engaging with said last mentioned member for in whole or in part supporting the weight of the drill.

13. A supporting and guiding apparatus for portable electric drills including a base, a standard, a bracket vertically adjustable on said standard, a pair of telescoping members, means for detachably securing one of said pair to said bracket, means for detachably securing the other of said pair to the drill, means for effecting the relative longitudinal movement of said pair to feed the drill, a member adapted to be secured to the drill and having sliding engagement with the standard, a rod secured to said bracket and extending substantially parallel to said standard and having sliding engagement with said member, and a coil spring encircling said rod for in whole or in part supporting the weight of the drill and said last mentioned member.

Signed at East Hartford, Conn., in the county of Hartford and State of Connecticut, this 27th day of November, A. D. 1922.

GEORGE A. ARNOLD.